(12) United States Patent
Ito et al.

(10) Patent No.: US 6,458,437 B1
(45) Date of Patent: Oct. 1, 2002

(54) HEAT-SHRINKABLE POLYESTER FILMS

(75) Inventors: Hideki Ito; Norimi Tabota; Hiroshi Nagano, all of Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/968,536

(22) Filed: Oct. 2, 2001

(51) Int. Cl.$^7$ .................... B32B 27/00; B32B 27/36
(52) U.S. Cl. ............... 428/35.1; 428/34.9; 428/480; 525/419; 525/420; 525/425; 525/437; 525/444; 528/308; 528/308.6
(58) Field of Search .................. 428/34.1, 34.9, 428/35.1, 480; 525/419, 420, 425, 437, 444; 528/308, 308.6

(56) References Cited

U.S. PATENT DOCUMENTS

| | | | |
|---|---|---|---|
| 5,932,685 A | * | 8/1999 | Mori et al. ............... 428/347 |
| 5,985,387 A | * | 11/1999 | Mori et al. ............... 428/332 |
| 6,342,281 B2 | * | 1/2002 | Hayakawa et al. ......... 428/327 |

FOREIGN PATENT DOCUMENTS

| | | |
|---|---|---|
| EP | 0 934 813 A2 | 8/1999 |
| EP | 1 024 162 A2 | 8/2000 |
| EP | 1 055 506 A1 | 11/2000 |
| EP | 1 090 739 A2 | 4/2001 |
| JP | 2000-135737 * | 5/2000 |

* cited by examiner

*Primary Examiner*—Vivian Chen
(74) *Attorney, Agent, or Firm*—Kenyon & Kenyon

(57) ABSTRACT

Heat-shrinkable polyester films, each having: a heat shrinkability of 30–60% after treatment in hot water at 70° C. for 5 seconds and of 65% or higher after treatment in hot water at 85° C. for 5 seconds, both in the main shrinkage direction, and of 10% or lower after treatment in hot water at 85° C. for 5 seconds in a direction perpendicular to the main shrinkage direction; a heat shrinkability after storage at 25° C. for one month of 25% or higher after treatment in hot water at 70° C. for 5 seconds in the main shrinkage direction; and a thickness distribution of 6% or lower, exhibit, when used for full labels on bottles, good shrinkage finish involving only rare occurrence of wrinkles, shrinkage spots, strains and shrinkage failure during heat shrinkage, and exhibit a low decrease in low temperature shrinkability after a lapse of time.

4 Claims, No Drawings

HEAT-SHRINKABLE POLYESTER FILMS

FILED OF INVENTION

The present invention relates to heat-shrinkable polyester films, and more particularly, it relates to heat-shrinkable polyester films suitable for full labels on bottles, particularly full labels on PET bottles, which exhibit, when used for full labels on bottles, good shrinkage finish involving only rare occurrence of wrinkles, shrinkage spots, strains and shrinkage failure during heat shrinkage, and which exhibit a low decrease in low temperature shrinkability after a lapse of time.

BACKGROUND OF THE INVENTION

For heat-shrinkable films, particularly used as labels on the barrels of bottles, films made of polyvinyl chloride or polystyrene have mainly been employed. However, polyvinyl chloride films have recently raised a serious problem on the evolution of chlorine-containing gases in the incineration for disposal, whereas polystyrene films have a serious problem on the difficulty of printing. Further, in the collection and recycling of PET bottles, labels made of resins other than PET, such as polyvinyl chloride or polystyrene, should be separated from the bottles. Therefore, considerable attention has been drawn to heat-shrinkable polyester films having no such problems.

In recent years, since colored bottles are not suitable for regeneration in regard to the recycling of PET bottles, alternative plans have been studied. Among them is a method of employing colored bottles and allowing colored labels to shrink over these bottles.

However, when used for full labels on bottles, since these bottles have complicated shapes in great variety, the conventional heat-shrinkable films may cause a serious problem on the shrinkage finish. In particular, for full labels on narrow-mouthed bottles, such as beverage bottles, having a great difference in diameter between their barrels and mouths, the conventional heat-shrinkable films may cause shrinkage failure at the necks of the bottles. Therefore, heat-shrinkable films used for full labels on such bottles should have excellent heat-shrinkage characteristics including high shrinkability. Further, the conventional heat-shrinkable films may require a change in the conditions of shrinkage finish by a decrease in low temperature shrinkability during storage before shrinkage, or they may exhibit poor shrinkage in some cases.

As described above, the conventional heat-shrinkable polyester films have insufficient performance for full labels on bottles.

SUMMARY OF THE INVENTION

The present invention, which can solve the above problems, has been made to provide heat-shrinkable polyester films suitable for full labels on bottles, particularly full labels on PET bottles, which exhibit, when used for full labels on bottles, good shrinkage finish involving only rare occurrence of wrinkles, shrinkage spots, strains and shrinkage failure during heat shrinkage, and which exhibit a low decrease in low temperature heat shrinkability after a lapse of time.

Thus the present invention provides heat-shrinkable polyester films each having: a heat shrinkability of 30–60% after treatment in hot water at 70° C. for 5 seconds and of 65% or higher after treatment in hot water at 85° C. for 5 seconds, both in the main shrinkage direction, and of 10% or lower after treatment in hot water at 85° C. for 5 seconds in a direction perpendicular to the main shrinkage direction; a heat shrinkability after storage at 25° C. for one month of 25% or higher after treatment in hot water at 70° C. for 5 seconds in the main shrinkage direction; and a thickness distribution of 6% or lower, thereby solving the above problems.

DETAILED DESCRIPTION OF THE INVENTION

The heat-shrinkable polyester films of the present invention are preferably produced from polyester compositions containing polyesters and polyester elastomers, which polyesters are composed of dicarboxylic acid components and diol components as constituent components. The polyester compositions preferably contain polyesters at 50–95 wt % and polyester elastomers at 5–50 wt %, more preferably at 5–20 wt %, and most preferably at 5–10 wt %. The reasons for this are that: when the amounts of polyester elastomers are higher than 50 wt %, there is a tendency for heat-shrinkable films to hardly have shrinkability required for close adhesion to vessels, which is not preferred; and when the amounts of polyester elastomers are lower than 5 wt %, heat-shrinkable films can hardly attain low temperature shrinkability and can easily cause shrinkage at a higher speed, so that there is a tendency for heat-shrinkable films to have deteriorated shrinkage finish involving the occurrence of wrinkles and strains during shrinkage, which is also not preferred.

The dicarboxylic acid components constituting the polyesters used in the present invention may include aromatic dicarboxylic acids terephthalic acid, isophthalic acid, naphthalenedicarboxylic acid and ortho-phthalic acid; aliphatic dicarboxylic acids such as adipic acid, azelaic acid, sebacic acid and decanedicarboxylic acid; and alicyclic dicarboxylic acids.

When aliphatic dicarboxylic acids (e.g., adipic acid, sebacic acid, decanedicarboxylic acid) are contained in the polyesters, their amounts may preferably be lower than 3 mol %. For heat-shrinkable polyester films obtained from the polyesters containing these aliphatic dicarboxylic acids at 3 mol % or higher, their film stiffness in the high-speed fitting is insufficient.

Further, the polyesters preferably contain no three or more functional polycarboxylic acids (e.g., trimellitic acid, pyromellitic acid, their anhydrides). For heat-shrinkable polyester films obtained from the polyesters containing these polycarboxylic acids, their high shrinkability required can hardly be attained.

The diol components constituting the polyesters used in the present invention may include aliphatic diols such as ethylene glycol, propanediol, butanediol, neopentyl glycol and hexanediol; alicyclic diols such as 1,4-cyclohexanedimethanol; and aromatic diols.

The polyesters used in the heat-shrinkable polyester films of the present invention preferably have glass transition temperatures (Tg) adjusted to 60–75° C. by incorporation of at least one selected from diols containing 3–6 carbon atoms (e.g., propanediol, butanediol, neopentyl glycol, hexanediol).

For heat-shrinkable polyester films exhibiting particularly excellent shrinkage finish, the use of neopentyl glycol as one of the diol components is preferred.

The polyesters preferably contain neither diols containing 8 or more carbon atoms (e.g., octanediol), nor three or more functional polyhydric alcohols (e.g., trimethylolpropane, trimethylolethane, glycerin, diglycerin). For heat-shrinkable polyester films obtained from the polymers containing these diols or polyhydric alcohols, their high shrinkability required can hardly be attained.

The polyesters preferably contain none of diethylene glycol, triethylene glycol, and polyethylene glycol, if possible. In particular, diethylene glycol may easily be formed as a by-product component in the polymerization of polyesters. The polyesters used in the present invention preferably contain diethylene glycol in amounts of smaller than 4 mol %.

When two or more polyesters are used in admixture, the amounts of acid components and the amounts of diol components are relative to the total amount of all acid components and the total amount of all diol components, respectively, both of which are contained in these polyesters, independently of whether or not transesterification has been carried out after the mixing.

To the heat-shrinkable polyester films of the present invention, there may preferably be added, for the purpose of improving their self-lubricating properties, inorganic lubricants such as titanium dioxide, fumed silica, kaolin and calcium carbonate; or organic lubricants such as long-chain fatty acid esters, and there may further be added, if necessary, additives such as stabilizers, colorants, antioxidants, defoamers, antistatic agents and ultraviolet light absorbers.

All the above polyesters can be prepared by polymerization according to the conventional methods. For example, the polyesters can be obtained using the direct esterification method in which dicarboxylic acids are directly reacted with diols or using the transesterification method in which dicarboxylic acid dimethyl esters are reacted with diols. The polymerization may be carried out in batch or continuous manner.

The polyester elastomers used in the present invention refer to polyester block copolymers composed of high melting point crystalline polyester segments (hard segments) and low melting point soft polymer segments with molecular weights of 400 or higher (soft segments) as constituent units, in which high molecular weight polymers formed only of the high melting point crystalline polyester segment constituent components have melting points of 200° C. or higher and the melting points or softening points when measured for only the low melting point soft polymer segment constituent components are 80° C. or lower.

The high melting point crystalline polyester segment constituent components, which have melting points of 200° C. or higher when formed only themselves into fibrillatable high molecular weight polymers, may include, for example, polyester segments composed of aromatic dicarboxylic acid residues, such as terephthalic acid, isophthalic acid, 1,5-naphthalenedicarboxylic acid and 2,6-naphthalenedicarboxilic acid, and aliphatic, aromatic or alicyclic diol residues, such as ethylene glycol, propylene glycol, tetramethylene glycol, pentamethylene glycol, 2,2-dimethyltrimethylene glycol, hexamethylene glycol, decamethylene glycol, p-xylene glycol and cyclohexanedimethanol; polyester segments composed of oxyacid residues, such as p-(β-hydroxyethoxy)benzoic acid and p-oxybenzoic acid pivalolactone; polyether ester segments composed of aromatic ether dicarboxylic acid residues, such as 1,2-bis(4,4'-dicarboxymethylphenoxy)ethane and di(4-carboxyphenoxy)-ethane, and the same diol residues as described above; and polyamide ester segments composed of aromatic amide dicarboxylic acid residues, such as bis(N-p-carboethoxydiphenyl)terephthalimide, and the same diol residues as described above.

There can also be mentioned copolyester segments using two or more of the above acids and/or two or more of the above glycols.

The low melting point soft polymer segments constituent components with molecular weights of 400 or higher refer to those which exhibit a substantially amorphous state among the polyester block copolymers and which have melting points or softening points of 80° C. or lower when measured for only these segment constituent components. Their molecular weights are usually 400–8000, preferably 700–5000.

The proportions of low melting point soft polymer segment constituent components in the polyester block copolymers are preferably 1–90 wt %. Particularly preferred proportions are 5–80 wt %.

Typical examples of the low melting point soft polymer segment constituent components may include polyethers such as polyethyleneoxide glycol, polypropyleneoxide glycol, polytetramethyleneoxide glycol, copolymerized glycols of ethyleneoxide and propyleneoxide, and copolymerized glycols of ethyleneoxide and tetrahydrofuran; aliphatic polyesters such as polyneo-pentyl azelate, polyneopentyl adipate and neopentyl sebacate; polymers of cyclic esters, such as poly-$\epsilon$-caprolactone.

The polyester elastomers are contained in the polyester resin compositions constituting polyester films, preferably at about 3–50 wt % in usual cases, more preferably at 5–30 wt %, and most preferably at 7–20 wt %.

The polyester elastomers used in the present invention are preferably polyester block copolymers using poly-$\epsilon$-caprolactone as the low melting point polymer segment. In particular, preferred are those which contain the polybutylene terephthalate component. The use of polyester resin compositions containing such polyester elastomers leads to the advantages that the resulting heat-shrinkable polyester films can easily attain low temperature shrinkability and have an improved effect on the prevention of a decrease in shrinkability after a lapse of time.

All the above polyester elastomers can be prepared by the conventional methods known in the art. For example, the polyester elastomers can be obtained by polymerization into prescribed block copolymers using the transesterification method in which dialkyl esters such as dicarboxylic acid dimethyl esters are reacted with diols and, if necessary, cyclic esters, or using the direct esterification method in which dicarboxylic acids are directly reacted with diols and, if necessary, cyclic esters. The polymerization may be carried out in batch or continuous manner.

For the heat-shrinkable polyester films of the present invention, the heat shrinkability as calculated by the following equation from the values of side length before and after shrinkage by treatment in hot water without a load.

$$\text{Heat shrinkability} = \text{Side length before shrinkage} - \text{Side length after shrinkage}/\text{Side length before shrinkage} \times 100(\%)$$

should be 30–60%, preferably 40–60%, after treatment in hot water at 70° C. for 5 seconds, and 65% or higher, preferably 75–95%, after treatment in hot water at 85° C. for 5 seconds, both in the main shrinkage direction, and 10% or lower, preferably 6% or lower, after treatment in hot water at 85° C. for 5 seconds in a direction perpendicular to the main shrinkage direction.

When the heat shrinkability in the main shrinkage direction is lower than 30% after treatment in hot water at 70° C. for 5 seconds, it results in a failure of low temperature shrinkage, requiring the rise in temperature for shrinkage, which is not preferred. In contrast, when the heat shrinkability is higher than 60%, label jumping occurs by heat shrinkage, which is also not preferred.

When the heat shrinkability in the main shrinkage direction is lower than 65% after treatment in hot water at 85° C. for 5 seconds, shrinkage failure occurs at the mouth portions of bottles depending on the bottle shapes, which is not preferred. In contrast, when the heat shrinkability is higher than 95%, there is a possibility that label jumping occur because of shrinkability remaining after heat shrinkage.

For the heat-shrinkable polyester films of the present invention, the heat shrinkability after storage at 25° C. for one month should be 25% or higher after treatment in hot water at 70° C. for 5 seconds in the main shrinkage direction. When the heat shrinkability after storage at 25° C. for one month is lower than 25%, it requires a change in the conditions of shrinkage finish, or the resulting films exhibit poor shrinkage in some cases, which is not preferred.

The heat-shrinkable polyester films of the present invention are preferably, but not particularly limited to, 10 to 200 μm, more preferably 20 to 100 μm, in thickness as the heat-shrinkable films for labels.

For the heat-shrinkable polyester films of the present invention, the thickness distribution should be 6% or lower. When the thickness distribution is higher than 6%, the resulting films occur the deviation of patterns in the super-position of many colors when processed in the multi-color printing, which is not preferred.

The following will describe a specific example of the process for producing the heat-shrinkable polyester film of the present invention; however, the present invention is not limited to this example.

The polyester base materials used in the present invention are dried using a dryer such as hopper dryer or paddle dryer, or a vacuum dryer, and melt at a temperature of 200–300° C. and extruded into a film shape. For extrusion, any of the existing methods can be used, such as T-die method or tubular method. After extrusion, rapid cooling gives an unstretched film.

The resulting unstretched film is then stretched at a ratio of 4.2 or higher, preferably 4.5 or higher, in the transverse direction at a temperature of Tg °C. or higher but lower than Tg+15° C., preferably Tg+5° C. or higher but lower than Tg+15° C.

The stretched film is heat treated, if necessary, at a temperature of 70–100° C. to give a heat-shrinkable polyester film.

The method of stretching may include uniaxial stretching only in the transverse direction (TD) with a tenter, in which case the film can further be stretched in the machine direction (MD) to thereby achieve biaxial stretching. Such biaxial stretching may be carried out either by the sequential biaxial stretching method or by the simultaneous biaxial stretching method, and the film may further be stretched, if necessary, in the machine or transverse direction.

For attaining the purpose of the present invention, the transverse direction (i.e., the direction perpendicular to the direction of extrusion) is practical as the main shrinkage direction; therefore, the above explanation was made for an example of the film formation when the transverse direction is taken as the main shrinkage direction. However, the film formation in which the machine direction (i.e., the direction of extrusion) is taken as the main shrinkage direction can also be carried out substantially in the same manner as described above, except that the stretching direction in the above explanation is turned 90 degrees around the line perpendicular to the film surface.

In the present invention, unstretched films obtained from polyesters are preferably stretched at a temperature of Tg °C. or higher but lower than Tg+15° C., preferably Tg °C or higher but lower than Tg+12° C.

When unstretched films are stretched at a temperature of lower than Tg °C., the resulting films can hardly have heat shrinkability as some of the claimed requirements of the present invention, and these films have deteriorated transparency, which is not preferred.

When unstretched films are stretched at a temperature of Tg+15° C. or higher, the resulting films exhibit insufficient film stiffness in the high-speed fitting, and these films have remarkably deteriorated thickness distribution, which is also not preferred.

For the heat-shrinkable polyester films of the present invention, the thickness distribution of the films as calculated from the values of film thickness by the following equation:

$$\text{Thickness distribution} = \frac{\text{Maximum thickness} - \text{Minimum thickness}}{\text{Average thickness}} \times 100\,(\%)$$

is preferably 6% or lower, more preferably 5% or lower.

The films having a thickness distribution of 6% or lower are easy to achieve the superposition of colors in the three-color printing carried out, for example, in the evaluation of shrinkage finish, whereas the films having a thickness distribution of higher than 6% are not preferred from the viewpoint of color superposition.

To make even thickness distribution in the heat-shrinkable polyester films of the present invention, unstretched films are preferably heated to a prescribed film temperature at a low air flow rate with a heat transmission coefficient of 0.0013 cal/cm$^2$·sec·°C. (0.0054 J/cm$^2$·sec·K) or lower in the step of preheating to be carried out prior to the step of stretching when unstretched films are stretched in the transverse direction with a tenter.

To prevent heat evolution in the films during stretching to reduce the unevenness of film temperature in the width direction of the films, the step of stretching is preferably carried out with a heat transmission coefficient of 0.0009 cal/cm$^2$·sec·°C. (0.0037 J/cm$^2$·sec·K) or higher, more preferably 0.0011–0.0017 cal/cm$^2$·sec·°C. (0.0045–0.0071 J/cm$^2$·sec·K).

When the heat transmission coefficient in the step of pre-heating is higher than 0.0013 cal/cm$^2$·sec·°C. (0.0054 J/cm$^2$·sec·K) or the heat transmission coefficient in the step of stretching is lower than 0.0009 cal/cm$^2$·sec·°C. (0.0037 J/cm$^2$·sec·K), the resulting films can hardly have even thickness distribution, so that these films cause the deviation of patterns in the super-position of many colors when processed in the multi-color printing, which is not preferred.

EXAMPLES

The present invention will hereinafter be further illustrated by some examples and comparative examples; however, the present invention is not limited to these examples.

The heat-shrinkable polyester films of the present invention were evaluated by the following methods.

(1) Heat shrinkability

A film just after formation or after storage at 25° C. for one month was cut into a square shape of 10 cm×10 cm with two sides parallel to the machine direction and to the transverse direction, respectively. This sample was heat shrunk by immersion under no load in hot water at 70±0.5° C. or 85±0.5° C. for a prescribed period of time and then measured for side lengths in the machine direction and in the transverse direction, respectively. The heat shrinkability was calculated from the measured values of side lengths by the following equation. The direction of either side corresponding to the larger value of heat shrinkability was referred to as the main shrinkage direction.

Heat shrinkability=

$$\frac{\text{Side length before shrinkage} - \text{Side length after shrinkage}}{\text{Side length before shrinkage}} \times 100\,(\%)$$

(2) Shrinkage finish

A film was printed with three inks of glass, gold and white colors, and cut into a rectangular shape of 221 mm in width along the main shrinkage direction and 50 mm in height along the direction perpendicular thereto. This sample was formed into a cylindrical label of 50 mm in height and 108 mm in folding diameter (i.e., length in the width direction when the label was folded flat) by attaching one end to the other in the main shrinkage direction (the width of margins for attachment was 5 mm) with 1,3-dioxolane. The label was fitted on a 500-mL PET bottle (20.6 cm in height and 6.5 cm in barrel diameter; the same bottle as manufactured by YOSHINO KOGYOSHO K. K. and used for "Afternoon Tea" from KIRIN BEVERAGE), and heat shrunk by allowing the labeled PET bottle to pass through a steam tunnel (model SH-1500-L) available from FUJI ASTEC, INC., at a zone temperature of 80° C. for a passage time of 2.5 seconds. This testing was carried out for 20 different samples of each film. The shrinkage finish was determined by visual observation and evaluated at 2 ranks on the following criteria:

Good: no shrinkage spots, jumping, or insufficient shrinkage were observed;

Poor: shrinkage spots, jumping, or insufficient shrinkage were observed.

(3) Glass transition temperature (Tg)

Using a differential scanning calorimeter (model DSC220) available from SEIKO INSTRUMENTS & ELECTRONICS LIMITED, an unstretched film of 10 mg in weight was heated from −40° C. to 120° C. at a heating rate of 20° C./min. to draw a heat absorption curve, from which the glass transition temperature (Tg) was determined. Two tangent lines were drawn before and after the inflection point on the heat absorption curve, and the point of their intersection was regarded as the glass transition temperature (Tg).

(4) Thickness distribution

A film was cut in a size of 5 cm×50 cm along the machine direction and along the transverse direction, respectively. This sample was measured for thickness (the number of measured points=20) with a contact thickness meter (model KG60/A) available from ANRITSU CORPORATION. For each sample, the thickness distribution (i.e., scattering of thickness) was calculated by the following formula. The measurement was repeated for fifty samples of each film, and the mean value of thickness distribution was determined and evaluated on the following criteria:

Thickness distribution=

$$\frac{\text{Maximum thickness} - \text{Minimum thickness}}{\text{Average thickness}} \times 100\,(\%)$$

Good: 6% or lower;

Fair: higher than 6% but lower than 10%;

Poor: 10% or higher.

(5) Intrinsic viscosity

A sample of 200 mg in weight was added to a mixture of phenol and tetrachloroethane (50:50 wt %) in 20 ml, and the mixture was then heated at 110° C. for 1 hour, followed by measurement of intrinsic viscosity at 30° C. with an Ostwald's viscometer.

The polyesters used in the examples and comparative examples were as follows:

Polyester A: polyethylene terephthalate (intrinsic viscosity (IV)=0.75 dl/g);

Polyester B: a polyester composed of 70 mol % ethylene glycol and 30 mol % neopentyl glycol, and terephthalic acid (IV=0.72 dl/g);

Polyester C: a polyester composed of 70 wt % polybutylene terephthalate and 30 wt % poly-ε-caprolactone (IV=1.30 dl/g);

Polyester D: polybutylene terephthalate (IV=1.20 dl/g).

Example 1

A mixture of 15 wt % polyester A, 75 wt % polyester B, and 10 wt % polyester C was melted at 280° C. and extruded from a T-die, and then rapidly cooled on chill rolls to give an unstretched film. This unstretched film has a glass transition temperature (Tg) of 69° C.

The unstretched film was pre-heated with a heat transmission coefficient of 0.0008 cal/cm$^2$·sec·°C. (0.0033 J/cm$^2$·sec·K) so that the film temperature came to 82° C., and then heated in a tenter with a heat transmission coefficient of 0.0012 cal/cm$^2$·sec·°C. (0.0050 J/cm$^2$·sec·K) and stretched at a ratio of 5 in the transverse direction at 80° C. to give a heat-shrinkable polyester film of 50 μm in thickness.

Example 2

A mixture of 10 wt % polyester A, 80 wt % polyester B, and 10 wt % polyester C was melted at 280° C. and extruded from a T-die, and then rapidly cooled on chill rolls to give an unstretched film. This unstretched film has a glass transition temperature (Tg) of 68° C.

The unstretched film was pre-heated with a heat transmission coefficient of 0.0008 cal/cm$^2$·sec·°C. (0.0033 J/cm$^2$·sec·K) so that the film temperature came to 81° C., and then heated in a tenter with a heat transmission coefficient of 0.0012 cal/cm$^2$·sec·°C. (0.0050 J/cm$^2$·sec·K) and stretched at a ratio of 5 in the transverse direction at 79° C. to give a heat-shrinkable polyester film of 50 μm in thickness.

Example 3

A mixture of 15 wt % polyester A, 78 wt % polyester B, and 7 wt % polyester C was melted at 280° C. and extruded from a T-die, and then rapidly cooled on chill rolls to give an unstretched film. This unstretched film has a glass transition temperature (Tg) of 70° C.

The unstretched film was treated in the same manner as described in Example 1 to give a heat-shrinkable polyester film of 50 μm in thickness.

Comparative Example 1

A heat-shrinkable polyester film of 50 μm in thickness was prepared in the same manner as described in Example, except that the stretching temperature was set at 87° C.

Comparative Example 2

A film was prepared in the same manner as described in Example 1, except that the stretching temperature was set at 65° C. The resulting film had caused whitening over the whole width at an outlet of the tenter.

Comparative Example 3

A mixture of 15 wt % polyester A, 75 wt % polyester B, and 10 wt % polyester D was melted at 280° C. and extruded from a T-die, and then rapidly cooled on chill rolls to give an unstretched film. This unstretched film has a glass transition temperature (Tg) of 69° C.

The unstretched film was pre-heated with a heat transmission coefficient of 0.0009 cal/cm$^2$·sec·°C. (0.0037 J/cm$^2$·sec·K) so that the film temperature came to 85° C., and then heated in a tenter with a heat transmission coefficient of 0.0009 cal/cm$^2$·sec·°C. (0.0037 J/cm$^2$·sec·K) and stretched at a ratio of 5 in the transverse direction at 83° C. to give a heat-shrinkable polyester film of 50 μm in thickness.

Comparative Example 4

A heat-shrinkable polyester film of 50 μm in thickness was prepared in the same manner as described in Example 1, except that the stretch ratio was changed to 4.0.

For the films obtained in Examples 1–3 and Comparative Examples 1–4, the polyester composition, the conditions of film formation, and the glass transition temperature are listed in Table 1, and the results of evaluation are shown in Table 2.

As can be seen from Table 2, all the films obtained in Examples 1–3 exhibited good shrinkage finish and had good thickness distribution. This indicates that the heat-shrinkable polyester films of the present invention have high quality and high practical availability, and therefore, they are particularly suitable for shrinkable labels.

In contrast, the heat-shrinkable film obtained in Comparative Example 1 exhibited poor shrinkage finish and had poor thickness distribution. The heat-shrinkable film obtained in Comparative Example 2 had caused whitening, and therefore, it was not suitable for practical use. The heat-shrinkable polyester films obtained in Comparative Example 3 had inferior shrinkability at a low temperature with time and caused the occurrence of wrinkles by shrinkage and exhibited insufficient shrinkage, all resulting in poor shrinkage finish. The heat-shrinkable polyester films obtained in Comparative Example 4 caused the occurrence of wrinkles by shrinkage and exhibited insufficient shrinkage, all resulting in poor shrinkage finish. Thus all the heat-shrinkable films obtained in Comparative Examples had low quality and low practical availability.

TABLE 1

| | Base materials (wt %) | | | | Stretch ratio (times) | Conditions of film formation Pre-heating/ stretching temperatures (° C.) | Glass transition temperature of unstretched film (° C.) |
|---|---|---|---|---|---|---|---|
| | Polyester A | Polyester B | Polyester C | Polyester D | | | |
| Example 1 | 15 | 75 | 10 | — | 5.0 | 82/80 | 69 |
| Example 2 | 10 | 80 | 10 | — | 5.0 | 81/79 | 68 |
| Example 3 | 15 | 78 | 7 | — | 5.0 | 82/80 | 70 |
| Comp. Ex. 1 | 15 | 75 | 10 | — | 5.0 | 82/87 | 69 |
| Comp. Ex. 2 | 15 | 75 | 10 | — | 5.0 | 82/65 | 69 |
| Comp. Ex. 3 | 15 | 75 | — | 10 | 5.0 | 85/83 | 69 |
| Comp. Ex. 4 | 15 | 75 | 10 | — | 4.0 | 82/80 | 69 |

Polyester A: TPA//EG = 100//100 (mol %)
Polyester B: TPA//EG/NPG = 100//70/30 (mol %)
Polyester C: polyester D//poly-ε-caprolactone = 70//30 (wt %)
Polyester D: TPA//BD = 100//100 (mol %)
TPA: terephthalic acid
EG: ethylene glycol
NPG: neopentyl glycol
BD: butanediol

TABLE 2

| | Heat shrinkability (%) | | | | | Heat shrinkability after a lapse of time* |
|---|---|---|---|---|---|---|
| | TD | | MD | Shrinkage | Thickness | TD, 70° C. |
| | 70° C. | 85° C. | 85° C. | finish | distribution | (%) |
| Example 1 | 50 | 78 | −1 | good | good | 46 |
| Example 2 | 53 | 78 | −3 | good | good | 48 |

TABLE 2-continued

| | Heat shrinkability (%) | | | Shrinkage finish | Thickness distribution | Heat shrinkability after a lapse of time* |
|---|---|---|---|---|---|---|
| | TD | | MD | | | TD, 70° C. |
| | 70° C. | 85° C. | 85° C. | | | (%) |
| Example 3 | 48 | 78 | −3 | good | good | 40 |
| Comp. Ex. 1 | 36 | 68 | −4 | poor | poor | 30 |
| Comp. Ex. 2 | — | — | — | — | — | — |
| Comp. Ex. 3 | 28 | 78 | −3 | fair | good | 16 |
| Comp. Ex. 4 | 23 | 63 | −3 | poor | fair | 18 |

*25° C., one month later

According to the present invention, heat-shrinkable films suitable for full labels on bottles, particularly full labels on PET bottles, can be obtained.

The heat-shrinkable polyester films of the present invention exhibit, when used for full labels on bottles, good shrinkage finish involving only rare occurrence of wrinkles, shrinkage spots, strains and shrinkage failure during heat shrinkage, and exhibit a low decrease in low temperature shrinkability after a lapse of time.

What is claimed is:

1. A heat-shrinkable polyester film having: a heat shrinkability of 30–60% after treatment in hot water at 70° C. for 5 seconds and of 65% or higher after treatment in hot water at 85° C. for 5 seconds, both in the main shrinkage direction, and of 10% or lower after treatment in hot water at 85° C. for 5 seconds in a direction perpendicular to the main shrinkage direction; a heat shrinkability after storage at 25° C. for one month of 25% or higher after treatment in hot water at 70° C. for 5 seconds in the main shrinkage direction; and a thickness distribution of 6% or lower.

2. A heat-shrinkable polyester film according to claim 1, which is made of a polyester resin and a polyester elastomer.

3. A heat-shrinkable polyester film according to claim 2, wherein the polyester elastomer comprises ε-caprolactam and polybutylene terephthalate components.

4. A heat-shrinkable polyester film according to claim 1, which is used for full labels on PET bottles.

* * * * *